Aug. 21, 1951  R. WEMMER, SR  2,564,942
DUCK CALLER
Filed Sept. 20, 1948  2 Sheets-Sheet 1
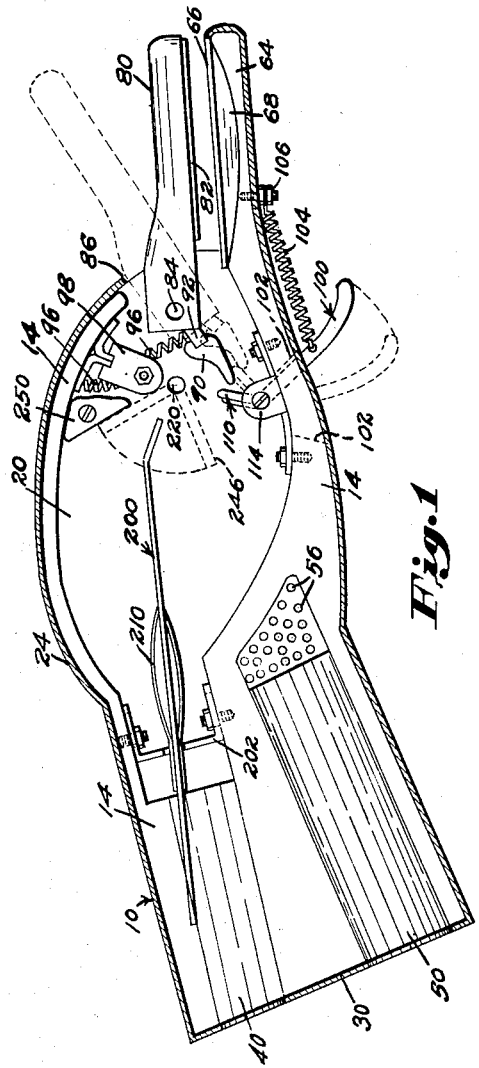
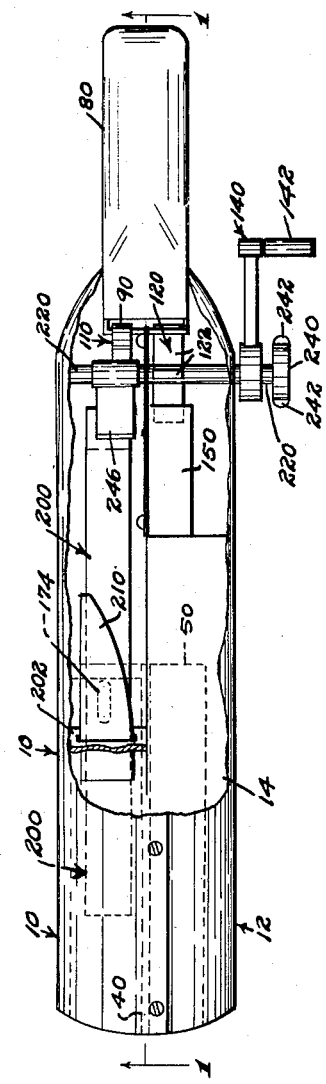
Inventor
Roy Wemmer, Sr.,
Arthur H. Sturges.
By
Attorney Aug. 21, 1951  R. WEMMER, SR  2,564,942
DUCK CALLER
Filed Sept. 20, 1948  2 Sheets-Sheet 2
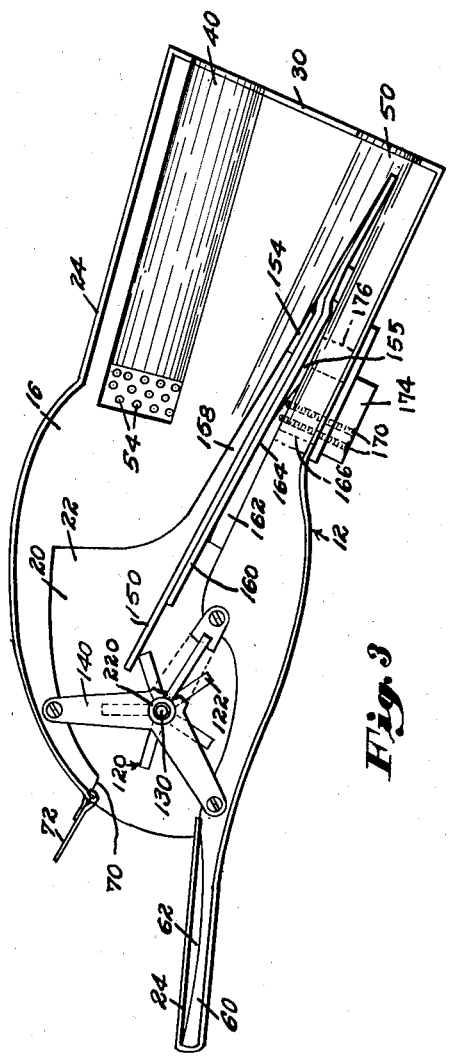
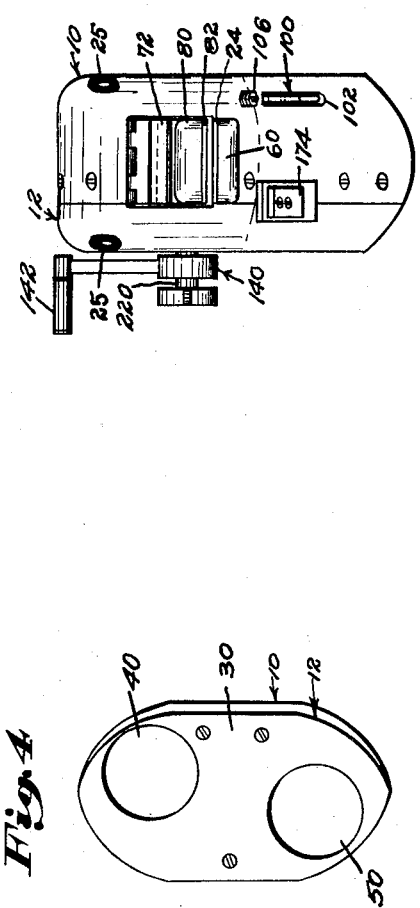
Inventor
Roy Wemmer, Sr.,
By Arthur H. Sturges
Attorney Patented Aug. 21, 1951

2,564,942

UNITED STATES PATENT OFFICE 2,564,942

DUCK CALLER

Roy Wemmer, Sr., Omaha, Nebr.

Application September 20, 1948, Serial No. 50,111

7 Claims. (Cl. 46—192)

This invention relates to duck calling devices such as are employed by hunters to lure wild game.

It is well known that duck hunters conceal themselves in what is known as a "blind" composed of sticks, cornstalks, brushes or the like. Floating on the water within gunshot range of the blind, hunters place a number of artificial decoys, usually made of wood in the semblance of floating ducks. At the time a flock of wild ducks approach the decoys, the hunters cause a sound to be generated simulating duck conversation. The wild ducks, thinking the sounds are emanating from the decoys, fly toward the flock of decoys and within range of the hunter's shotgun.

Artificial duck calls heretofore employed have been primarily wind-actuated, the vibratable reeds of these duck-calling devices being vibrated by blowing with the mouth on one end of the device. However, great skill and knowledge is required to operate these calling devices. It is, therefore, an object of the invention to provide a duck-calling device which may be easily operated by all hunters regardless of previous experience and ability.

Another object of the invention is to provide a duck call as described which is adapted to simulate the call of a wild mallard drake.

A further object of the invention is to provide a device as described for simulating the chuckle as well as the chatter of a hen duck.

Another object of the invention is to provide a device so constructed that drake calls and hen calls emanate therefrom in alternation, if desired.

A still further object of the invention is to provide a device as described simulating in appearance the head of a mallard duck for providing the device with greater sales appeal.

Another object of the invention is to provide a device for the purpose described which is sturdy and durable in construction, reliable and efficient in operation, and relatively simple and inexpensive to manufacture, assemble and utilize.

Other and still further objects and advantages of the invention will become apparent from the following detailed description of a preferred embodiment thereof:

In the drawings:

Figure 1 is a view-in-section taken along the line 1—1 of Figure 2, a swinging reed-actuating lug attached to another half-portion of the invention being shown in dotted lines in two positions;

Figure 2 is a top plan view of the duck call of the invention, a portion of the cover thereof and attached mechanisms for controlling the action of the upper half-portion of the duck call bill being broken away;

Figure 3 is a side elevation of that half-portion of the duck call which is oppositely disposed with respect to the portion shown in Figure 1, parts thereof being shown in dotted lines;

Figure 4 is a rear elevation of the rearward end of the duck-calling device when assembled for use, portions forwardly disposed from the rearward wall of the duck call not being shown; and Figure 5 is a frontal elevation of the duck-calling device of the invention.

The new duck call is formed primarily of two half-portions, 10 and 12. The portions 10 and 12 are preferably provided with bodies or frames 14 and 16. The frames 14 and 16 are shaped in outer contour similarly to half-portions of the head of a duck and the portions 14 and 16 may be composed of any suitable material.

Recesses 20 and 22 are provided in the head-section of the main frames 14 and 16, respectively. The recesses 20 and 22 are adapted to cooperate to form a large chamber in the head section of the call at a time when the two half-portions 10 and 12 are placed alongside each other and secured together during use.

As thus described, the head section of the call is hollow for receiving a later described mechanism. The outer side of the frame portions 14 and 16 of the call may be covered by any suitable material 24, which is also preferably in the shape of the head and upper neck portion of a duck, having eyes 25.

The frame portions 14 and 16, as well as the covering 24, preferably are provided with rear surfaces 30, which extend transversely across the simulated neck section of the call.

The neck portion of the duck call is preferably provided with two cylindrical elongated recesses 40 and 50 therein. The recesses 40 and 50 are disposed one above the other in the neck section and open outwardly of the rearward side 30 of the call. The recessed portions 40 and 50 are each provided with apertures 54 and 56 respectively through the frames 14 and 16 for permitting sound to escape from the recesses 40 and 50.

As thus described other calling devices, not shown, and of the conventional windblown type may be inserted into the openings 40 and 50, the mouth pieces thereof protruding rearwardly out of the openings.

The duck frame portion 16 is provided with a partial lower bill portion 60 having a recess 62 disposed beneath the outer cover 24 at the place where the cover 24 extends across the upper side of the lower bill 60.

The other frame member 14 is similarly provided with a bill portion 64 which is covered by a palate member 66 which is preferably made of wood for desired sound qualities. The other bill portion 64 is also provided with a recess 68 beneath the palate portion 66.

As thus described the recesses 62 and 68 together form a hollow palate portion for influencing the sound qualities of the call.

The frame portion 16 is without an upper bill portion and is provided with an opening 70 at the point where the upper bill portion would normally be. On the upper side of the opening 70 a weather flap 72 is hingedly secured to the adjacent edge of the cover 24 so that the weather flap 72 is adapted to pivot upwardly and downwardly, and yet at all times be disposed above a later described upper bill portion.

The frame portion 14 is provided with an upper bill portion 80 which may be also supplied with a hollow sounding portion, not shown, but disposed above a second palate member 82.

The upper bill portion 80 is secured by means of a pivot pin 84 to the frame 14 in a manner such that the upper bill portion 80 can pivot upwardly and downwardly in the opening 70 of the frame portion 16 and the corresponding opening 86 in the frame portion 14. When the portions 14 and 16 are placed together the opening 70 and the opening 86 form a single opening.

On the rearward end of the movable upper bill 80 the latter is provided with a strike-plate 90 secured to the bill 80 by means of a bracket 92. A spring 96 is provided and is adapted to push downwardly upon the bracket 92 for pushing the outer end of the bill 80 upwardly.

The upper end of the spring 96 is secured to the spring mounting 98 which is itself secured to the frame member 14 in the chamber 20.

The mounting 98 is preferably of a type adapted to grip the spring 96 in any one of a plurality of positions so that the tension of the spring 96 may be regulated. An overlapping and unused portion of the spring 96 extends to the rearward of the mounting 98, as best shown in Figure 1.

A trigger member 100 is provided and is partially disposed in the chamber 20 and partially disposed extending through a slot 102 in the frame 14. The trigger member 100 is provided with a spring 104 secured to its outer end and secured by a bolt 106 to the lower bill portion 64 for maintaining the trigger disposed forwardly at its lower end except when actuated.

The upper end of the trigger is inclinedly disposed with respect to the lower portion. The upper end 110 being inclined forwardly and upwardly for engaging the strike plate 90 at times when the lower portion of the trigger 100 is pulled rearwardly.

Between the lower portion and the upper portion 110 the trigger 100 is pivotally secured to a trigger mounting 114 which is itself fastened to the frame 14 on the lower inner wall of the chamber 20.

The duck call further includes a lug wheel 120 which is preferably provided with a plurality of lugs 122 extending radially outwardly from its hub. The lug wheel 120 is pivotally secured by means of a shaft 130 to the frame portion 16. The shaft 130 extends to the outside of the head of the duck call on one end at which end it is provided with a crank 140 having a swivel handle 142.

The inner end of the shaft 130 is secured to a bearing member 140' and the latter is secured to the frame member 16. A resilient reed 150 is provided as best shown in Figure 3 and is secured in any suitable manner as by means of wedges 154 and 155 in a suitable elongated portion 158 of the chamber 20.

The reed 150 is adapted to vibrate when actuated and the free end of the reed 150 is disposed in the chamber 20 in a position to be struck successively by the turning lugs 122 of the lug wheel 120.

A sounding member or second reed 160 is provided being parallel to and similar to the reed 150 and mounted with the flat side positioned to slap the flat facing side of the reed 150. The free end of the reed 160 is disposed preferably beneath the reed 150 so that at times when the reed 150 is urged upwardly by the lugs 122 of the lug wheel 120, the reed 160 will be raised and released. When released, the reed 150 will slap downwardly against the reed 160 making a noise similar to a hen duck call.

Means are provided for changing the pitch of the hen duck call and such means includes a vibration controlling or modifying member or wedge 162 which is adapted to urge upwardly upon the second or lower reed 160 at a point spaced apart from the secured portions of the reeds.

The wedge 162 is preferably provided with an arcuate upper surface 164 which is secured by means of a sliding member 166 and two screws 170 to a finger grip or control member 174 which latter is disposed on the outer side of the frame 16. The member 166 is preferably elongated and of a thickness for slidable reception in the elongated slot 176 which latter extends forwardly and rearwardly along the lower side of the neck of the duck call.

The duck call further includes a piece of resilient vibrable material 200 secured at one end to the frame 14 and having a free end extending into the sounding chamber 20. A suitable pinched bracket 202 is provided for bearing against the member 200 at a point disposed away from the adjacent wall of the chamber 20.

Between the pinched bracket 202 and the member 200 a sounding member 210 is provided. The latter may be formed of celluloid and is preferably disposed on both sides of the vibrable member 200 and in the path of vibration of the member 200. The sounding member 210 is preferably of approximately a U shape in cross-section being formed by folding an elongated piece of suitable material.

Means are provided for causing the vibrable piece 200 to vibrate. Such means includes a tubular shaft 220 which latter is preferably provided with a hollow center through which the shaft 130 is disposed as best shown in Figure 2.

The tubular shaft 220 extends transversely through the head portion of the duck call being rotatably secured to the frame portion 16. One end of the tubular shaft 220 extends outwardly of the side of the portion 16 as best shown in Figure 2 and a hand grip 240 having oppositely disposed ears 242 is rigidly secured to the shaft 220 for facilitating the rotation of the latter.

On the inner end of the shaft 220 the latter is provided with a swingable lug 246 which is adapted to swing upwardly and downwardly between the dotted line positions shown in Figure 1 for actuating the vibrable member 200.

At the upper end of the portion 14 the upper wall of the recess 20 is provided with a lug stop member 250 which is secured thereto in a suitable manner and which is adapted to limit the swinging movement of the lug member 246.

As thus described, at times when the two half-portions 10 and 12 are secured together by means of suitable screws a duck call is provided the drake calling vibratory member 200 of which is actuated by rotating the finger grip 240.

A realistic hen call is attained by rotating the handle 140 of the lug wheel 120 and thereby causing the reed 150 to slap the reed 160. A vary in pitch may be given to hen call by sliding the member 174 forwardly and rearwardly for causing the wedge 162 to engage the reed 160 at different points.

Further natural noises imitating the chatter of a hen duck are produced by the upward and downward movements of the upper bill portions 80 during rotation of the lug wheel 120.

Still another variation of the call can be made by pulling rearwardly on the trigger 100 thus holding the bill 80 in an upward position as best shown in Figure 1. In such position the bracket 92 of the bill 80 is disposed free of the lug wheel 120 so that the lug wheel 120 cannot cause upward and downward movements of the upper bill portion 80, a call simulating the chuckle of a hen duck is thus simulated.

Further calls of the windblown variety in imitation of the natural noises of geese and other game may be conveniently received in the recesses formed by the recesses 40 and 50.

This invention has provided a duck call capable of operation by an amateur and which will realistically generate the calls of both hen and drake ducks.

From the foregoing description, it is thought to be obvious that a duck-calling device constructed in accordance with my invention is particularly adapted for use by reason of the convenience and facility with which it may be assembled and operated, and it will also be obvious that my invention is susceptible of some change and modification, including variations in the shape and size of the parts, without departing from the principles and spirit thereof, and for this reason I do not wish to be understood as limiting myself to the precise arrangement and formation of the several parts herein shown in carrying out my invention in practice, except as claimed.

I claim:

1. In a duck-calling device: a first flat resilient vibrable member having a free end; a second flat resilient vibrable member mounted with a flat side thereof positioned to coact with a flat side of said first member and in the path of vibration of said first member, said second member having a free end at the corresponding end thereof with respect to the free end of said first member, the free end of said first member being disposed extending outwardly beyond the free end of said second member; and means for moving said first member away from said second member then releasing said first member for vibration.

2. In a duck-calling device: a first flat resilient vibrable member having a free end; a second flat resilient vibrable member mounted with a flat side thereof positioned to coact with a flat side of said first member and in the path of vibration of said first member, said second member having a free end at the corresponding end thereof with respect to the free end of the first member, the free end of said first member being disposed extending outwardly beyond the free end of said second member, said members each having a flat surface facing the flat surface of the other member; and means for moving said first member away from said second member then releasing said first member for vibration.

3. In a duck-calling device: a first flat resilient member having a free end; a second flat resilient vibrable member mounted with a flat side thereof positioned to coact with a flat side of said first member and in the path of vibration of said first member, said second member having a free end at the corresponding end thereof with respect to the free end of said first member, the free end of said first member being disposed extending outwardly beyond the free end of said second member; means for securing said members at their other ends to hold said members in such positions; means for moving said first member away from said second member then releasing said first member for vibration; and means for engaging said second member on the opposite side of said second member from said first member to modify said vibration, said engaging means being disposed engaging said second member inwardly of the free end thereof and between the free end thereof and said securing means.

4. In a duck-calling device: a first flat resilient vibrable member having a free end; a second flat resilient vibrable member mounted with a flat side thereof positioned to coact with a flat side of said first member, said second member having a free end at the corresponding end thereof with respect to the free end of said first member, the free end of said first member being disposed extending outwardly beyond the free end of said second member, said members each having a flat surface facing the flat surface of the other member, said flat surfaces at certain times during vibration of said first member being disposed in engagement and in parallelism with each other; means for securing said members at their other ends to hold said members in such positions; means for moving said first member away from said second member then releasing said first member for vibration; and means for engaging said second member on the opposite side of said second member from said first member to modify said vibration, said engaging means being disposed engaging said second member inwardly of the free end thereof and between the free end thereof and said securing means, said engaging means being movable along said second member for engaging said second member at points various distances from the free end of said second member.

5. A duck-calling device as described in claim 4 in which the parts therein described are disposed in a housing and in which a movable control member is provided on the outside of the housing; in which the housing is provided with a slot therethrough; and in which means are provided for interconnecting said movable vibration-modifying member and said control member for simultaneous movement of said control and modifying members.

6. In a duck caller, the combination which comprises a substantially hollow housing, a reed positioned in said housing, means mounting the reed in the housing with one end fixed therein and the opposite end extended, a shaft extended through said housing and positioned beyond the end of the reed, one end of said shaft extended beyond a wall of the housing, means on the part of the shaft positioned in the housing for engaging the extended end of the reed, and sound producing means positioned in the housing and extended from a point adjacent the fixedly mounted end of the reed and extended on one side of the reed for coacting with the reed for producing a duck call.

7. In a duck caller, the combination which comprises a substantially hollow housing, an elongated flat lower reed positioned in said housing, means fixedly mounting one end of the reed in the housing with the opposite end thereof extended, a coacting elongated flat super-imposed reed in the housing and positioned above the lower reed, means fixedly mounting the end of the said super-imposed reed in the housing adjacent the fixedly mounted end of the lower reed and with the opposite end extended beyond the extended end of the lower reed, a shaft extended through the housing with one end thereof extended beyond the housing, lugs on the shaft and positioned to engage the extended end of the said supper-imposed reed, and means on the extended end of the shaft for actuating the said lugs through the said shaft.

ROY WEMMER, SR.

REFERENCES CITED

The following references are of record in the file of this patent:

UNITED STATES PATENTS

| Number | Name | Date |
|---|---|---|
| 726,277 | Fuller | Apr. 28, 1903 |
| 1,855,527 | Muehlstein | Apr. 26, 1932 |
| 1,995,682 | McKenzie | Mar. 26, 1935 |
| 2,047,784 | Krakowski | July 14, 1936 |
| 2,418,399 | Crisler | Apr. 1, 1947 |